United States Patent
Wirth et al.

(10) Patent No.: US 8,790,228 B2
(45) Date of Patent: Jul. 29, 2014

(54) AGRICULTURAL HARVESTER STRIPPER ROLLER

(75) Inventors: Roy Wirth, Northfield, NH (US); Matt Gorham, Hampstead, NH (US); Lawrence Nieder, Concord, NH (US); Donald James Marler, III, Emmaus, PA (US); Marc Godin, Pittsfield, NH (US)

(73) Assignee: Felton, Inc., Londonderry, NH (US)

( * ) Notice: Subject to any disclaimer, the term of this patent is extended or adjusted under 35 U.S.C. 154(b) by 432 days.

(21) Appl. No.: 12/965,895

(22) Filed: Dec. 12, 2010

(65) Prior Publication Data

US 2011/0143899 A1      Jun. 16, 2011

Related U.S. Application Data

(60) Provisional application No. 61/285,998, filed on Dec. 13, 2009.

(51) Int. Cl.
     *B25F 5/02*          (2006.01)
(52) U.S. Cl.
     USPC ............................. 492/45; 264/239; 56/128
(58) Field of Classification Search
     USPC ......... 29/428; 264/239; 460/122, 71; 492/38, 492/45; 56/126–130
     See application file for complete search history.

(56) References Cited

U.S. PATENT DOCUMENTS

| | | | |
|---|---|---|---|
| 283,529 A * | 8/1883 | Stewart | 460/71 |
| 449,438 A * | 3/1891 | Frantz | 460/71 |
| 665,806 A * | 1/1901 | Smith | 38/63 |
| 1,424,933 A * | 8/1922 | Owen | 460/75 |
| 2,152,730 A * | 4/1939 | Cory | 56/12.4 |
| 2,673,440 A | 3/1954 | Sawyer et al. | |
| 2,970,333 A | 2/1961 | Jones | |
| 2,978,725 A | 4/1961 | Whitman | |
| 2,978,726 A | 4/1961 | Park | |
| 3,139,641 A | 7/1964 | Grogan | |
| 3,355,758 A | 12/1967 | Clark | |
| 3,393,418 A | 7/1968 | Mundo | |
| 3,533,125 A | 10/1970 | Buechel | |
| 3,646,639 A * | 3/1972 | Burckhardt et al. | 19/97 |
| 3,839,763 A | 10/1974 | Gould | |
| 3,862,463 A | 1/1975 | Reiter | |
| 3,900,914 A | 8/1975 | Lewland | |
| 3,942,210 A | 3/1976 | Clark | |
| 3,942,211 A | 3/1976 | Clark | |
| 4,142,267 A | 3/1979 | Clark | |
| 4,194,260 A | 3/1980 | Culp | |
| 4,627,131 A * | 12/1986 | Iwata | 19/97 |
| 4,951,451 A * | 8/1990 | Klinner | 56/16.5 |
| 5,036,653 A * | 8/1991 | Klinner | 56/130 |
| 5,109,976 A | 5/1992 | Makino et al. | |

(Continued)

*Primary Examiner* — David Bryant
*Assistant Examiner* — Jacob Cigna
(74) *Attorney, Agent, or Firm* — Peter A. Nieves; Sheehan Phinney Bass + Green PA

(57) ABSTRACT

A stripper roller for use in a stripper unit subassembly is disclosed to simplify changing and replacement of parts. Brushes and batts are mounted in interlocking core segments that rotate in rigid accompaniment with a center shaft. The core segments are secured together and secured to the center shaft using retainer caps, and the retainer caps in turn are secured to the shaft to prevent lateral sliding of the stripper roller. Individual batts and brushes may be inserted into or removed from a reusable core segment, or the individual batts and brushes may be integrally affixed to replaceable core segments.

26 Claims, 8 Drawing Sheets

(56) References Cited

U.S. PATENT DOCUMENTS

| | | | |
|---|---|---|---|
| 5,285,622 A | * | 2/1994 | Klinner .......................... 56/130 |
| 5,313,771 A | | 5/1994 | France |
| 5,690,300 A | * | 11/1997 | Iannucci .................... 242/571.2 |
| 6,546,709 B2 | | 4/2003 | Goering |
| 6,792,859 B2 | * | 9/2004 | Fukui et al. ................... 101/378 |
| 6,910,571 B1 | * | 6/2005 | Ertel ............................. 198/780 |

\* cited by examiner

AGRICULTURAL HARVESTER STRIPPER ROLLER

CROSS-REFERENCE TO RELATED APPLICATIONS

This application claims the benefit of U.S. Provisional Patent Application Ser. No. 61/285,998, filed Dec. 13, 2009, entitled "Agricultural Harvester Stripper Roller." This provisional application is incorporated herein as if fully set forth.

FIELD OF THE INVENTION

The present invention is related to stripper rollers, and more particularly is related to stripper rollers having a segmented and/or split core.

BACKGROUND

FIG. 1 shows a stripper roller subassembly 900 of the sort used in conventional agricultural stripper units of mechanized devices for stripping, picking, and harvesting of cotton or other such agricultural crops planted in rows on farms. For example, the stripper roller subassembly 900 shown in FIG. 1 is typical of that employed in the stripper row heads of products such as the 7460 Cotton Stripper® (registered trademark of John Deere & Company of Moline, Ill., USA) manufactured by John Deere & Company of Moline, Ill., USA.

As can be seen by FIG. 1, such conventional stripper roller subassemblies 900 are heavy and contain many separate parts held together by threaded fasteners or otherwise requiring tools, including specialized tools, for assembly and disassembly. For example, the stripper roller subassembly 900 shown in FIG. 1 has a total of 122 components that are held together by a large assortment of hardware including nuts, bolts, washers, and pins, just a portion of which are indicated in the drawing by reference numeral 905.

Despite the large number of parts and difficulty of assembly and disassembly, however, there is in practice frequent need to carry out disassembly and reassembly, often in the field and often without access to more than only the simplest of tools. For example, brushes and/or batts mounted on stripper rollers wear out and must be replaced even under normal operating conditions. Furthermore, when plant stalks get caught within a rotating stripper roller subassembly, this can cause accelerated wear to occur where the plant stalk presses against the brush or batt. Moreover, operators of such mechanized devices for stripping, picking, and harvesting will often want to vary the number and arrangement of brushes and/or batts that are mounted on stripper rollers in correspondence to field, crop, weather, and moisture conditions.

However, the number of components, complexity of design, and use of threaded fasteners or other hardware requiring specialized tools for removal and/or reassembly make the stripper roller subassembly difficult to maintain and service in the field. Furthermore, such agricultural machinery is exposed to the elements, such as operating in the presence of soil or sand in outdoor weather conditions, meaning that dirt, moisture, and other contaminants will cause nuts, bolts, and screws to rust and seize in place, making disassembly difficult.

There is therefore a need to carry out such changeovers and repairs quickly and conveniently in the field by personnel without specialized training and without access to anything but the most commonly available tools.

Thus, a heretofore unaddressed need exists in the industry to address such deficiencies and inadequacies.

SUMMARY

A first aspect of the invention is a stripper roller for use in a subassembly. The stripper roller includes a shaft having an axially extending length, an axis of rotation and a first core disposed around the shaft. The core is keyed to the shaft so that it is constrained to rotate around the shaft axis of rotation in rigid accompaniment with the shaft. The first core has a first core member and a second core member, the first core member having an axially extending shaft engagement surface, an axially extending core member mating surface configured to be disposed adjacent to the core member mating surface of the second core member, and an axially extending recess area disposed substantially opposite the shaft engagement surface of the first core member. The stripper roller further includes a recess area insert having a proximal edge and a distal edge, the recess area insert proximal edge disposed to slidably engage within the first core member recess area. The stripper roller also includes a cap having a center hole configured to slidably engage around the shaft. The cap is configured to engage the first core so that the cap holds the first core member mating surface adjacent to the second core member mating surface. The cap is further configured to cover the end of the recess area, thereby containing the recess area insert within the recess area. A stop is configured to restrain the cap from sliding along the shaft.

The recess insert of the first aspect of the invention may be a brush or a batt, and the recess area insert proximal edge may slidably engage the first core member recess area with a dovetail joint or a T-joint, or other such interlocking geometrical arrangement. The stop may be a cotter pin configured to engage a hole through the shaft. The aforementioned cap may include fingers that slideably engage the first core. The cap may be an end cap, or the cap may be a mid cap that slideably engages the first core and a second core. The recess area batt or brush insert length may span the length of the first core and the second core. The shaft may have a substantially hexagonally shaped cross section, or similarly keyed shaft. The first core may consist of two core members, and the cross section of each core member may be substantially hemispherical. Alternatively, the first core may consist of six core members, wherein each core member may have a first core member interlocking surface and a second core member interlocking surface, the first core member interlocking surface having a male projection, and the second core member interlocking surface having a female recess.

A second aspect of the invention is a stripper roller for use in a subassembly. Like the stripper roller of the first aspect, the second aspect stripper roller includes a shaft having an axially extending length and an axis of rotation and a first core disposed around the shaft. The core is keyed to the shaft so that it is constrained to rotate around the shaft axis of rotation in rigid accompaniment with the shaft. The first core has a first core member and a second core member, the first core member having an axially extending shaft engagement surface, and a first core member mating surface configured to be disposed adjacent to a second core member mating surface of the second core member. Each core member has an axially extending recess area disposed substantially opposite the shaft engagement surface.

The first mating surface of the second aspect has a male projection, and the second mating surface has a female recess.

The stripper roller of the second aspect also includes a recess area insert having a proximal edge and a distal edge, the recess area insert proximal edge disposed to fixedly engage within the first core member recess area. The stripper roller also includes a cap having a center hole configured to slidably engage around the shaft. The cap is configured to engage the first core so that the cap holds the first core member mating surface adjacent to the second core member mating surface. A stop is configured to restrain the cap from sliding along the shaft.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

To simplify changing and replacement of parts in stripper roller subassemblies, brushes and/or batts are mounted in dovetail fashion or other such interlocking arrangement about the outside peripheral surface of a split core having more or less cylindrical cross-section when assembled. When the members of the split core are joined and held together by a series of retainer caps, the inside peripheral surface of the assembled core becomes rigidly coupled to a hexagonal or similarly keyed shaft that is captured centrally therewithin so as to permit the assembled core, with interlocking brushes and/or batts mounted thereon, to rotate in accompaniment to rotation of the central shaft against resistance from the stripping action of the brushes and/or batts as cotton bolls or other agricultural commodities to be stripped from plants are carried thereto by augers or other such harvester or stripper transport mechanisms.

Figure 1:
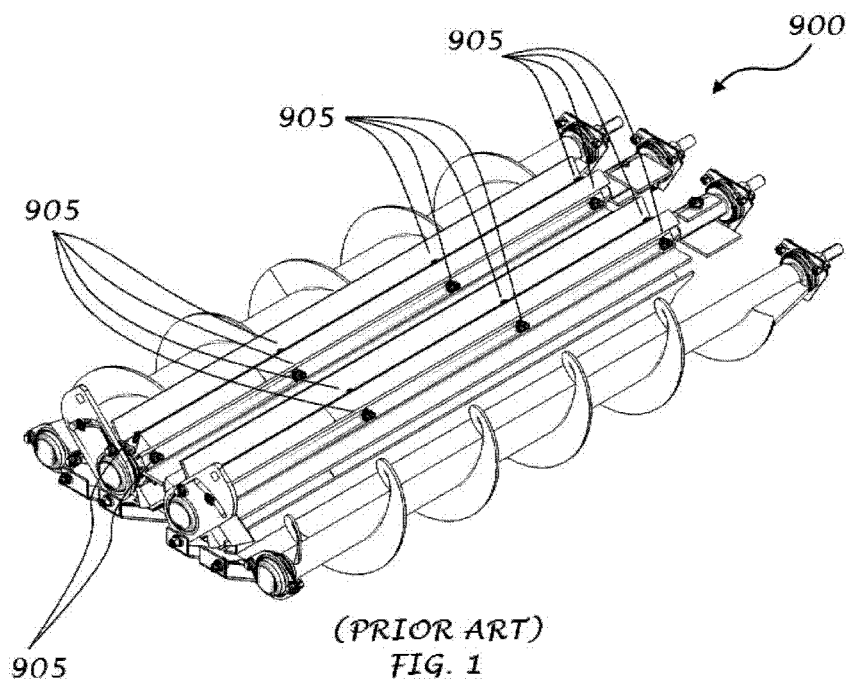
FIG. 1 is a perspective view of a conventional stripper roller subassembly in accordance with the prior art.
Figure 2:
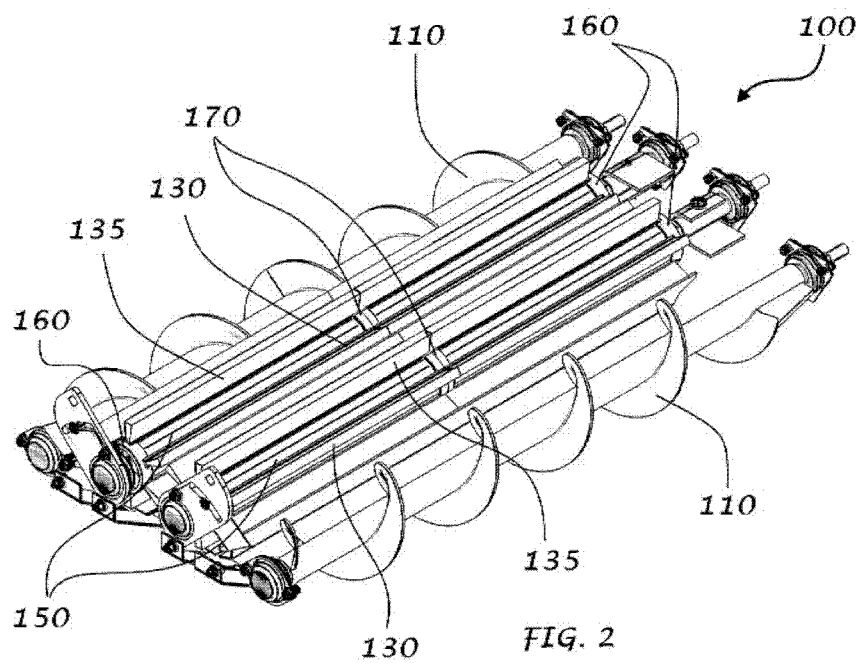
FIG. 2 is a perspective view of a stripper roller subassembly for an agricultural stripper unit in accordance with a first embodiment of the present invention.

FIG. 2 illustrates a stripper roller subassembly 100 in accordance with a first embodiment of the present invention. The stripper roller subassembly 100 shown in FIG. 2 is part of an agricultural stripper unit in an agricultural stripper, picker, or harvester (hereinafter generically referred to as "harvester" for brevity but implying any or all of the foregoing). The stripper roller subassembly 100 may, for example, be employed in the stripper row head of the 7460 Cotton Stripper® (registered trademark of John Deere & Company of Moline, Ill., USA) manufactured by John Deere & Company of Moline, Ill., USA. Such an agricultural stripper unit may employ any number of stripper roller subassemblies 100, and each stripper roller subassembly 100 may employ any number of stripper rollers 150.

At the stripper roller subassembly 100 shown in FIG. 2, rotating and stripping components are shown, housing components, drive gears, and various supporting structures having been omitted for clarity. The stripper roller subassembly 100 contains two stripper rollers 150, disposed at inner locations within the stripper roller subassembly 100, which operate in cooperation with two augers 110, disposed at outer locations within the stripper roller subassembly 100. The stripper roller subassembly 100 is typically oriented in inclined or upright fashion within the cotton stripper or other such agricultural harvester such that the shafts of the stripper rollers 150 and augers 110 have one end disposed toward the ground or plant level and the other end elevated with respect thereto. At FIG. 2 and at all drawings except FIG. 3, the end disposed toward the ground when the harvester is in operation is shown to the left in the drawing, and the end that is elevated when the harvester is in operation is shown to the right in the drawing.

During operation, the stripper rollers 150 rotate in mutually opposed and counterrotational fashion, and furthermore, each auger 110 rotates in opposed and counterrotational fashion with respect to the stripper roller 150 closest thereto. As the harvester travels down rows of a planted crop ready for harvest, rotation of the augers 110 causes cotton bolls attached to standing cotton plant stalks or other such agricultural crop to be carried upward from ground or plant level toward the mutually opposed stripper rollers 150. Beating action from brushes 130 and/or batts 135 mounted on the stripper rollers 150 acts to strip cotton bolls or other such crop ready for harvest from stalks and guide the stripped cotton bolls or other crop toward storage bins by way of fans and screens with optional assistance from outboard augers or other such transport mechanism.

Figure 3:
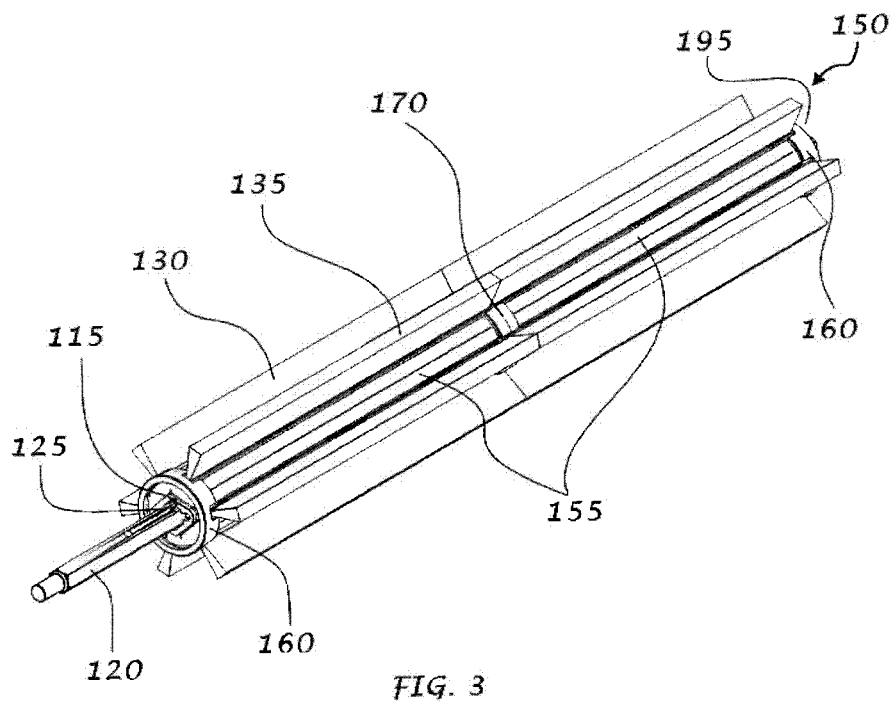
FIG. 3 is a perspective view of one of the two stripper rollers present in the stripper roller subassembly of the first embodiment shown in FIG. 2.

FIG. 3 shows one of the two stripper rollers 150 present in the stripper roller subassembly 100 of FIG. 2. At FIG. 3, note that the orientation of the stripper roller 150 is shown reversed relative to the orientation of the stripper roller 150 as shown in other drawings, the end of the stripper roller 150 that is disposed toward the ground when the harvester is in operation being shown to the right in FIG. 3, and the end of the stripper roller 150 that is elevated when the harvester is in operation being shown to the left in FIG. 3, so as to reveal a cotter pin 115 that is inserted in a hole 125 in the shaft 120 so as to hold an end cap 160 in place when the stripper roller 150 is in its assembled configuration.

Figure 4:
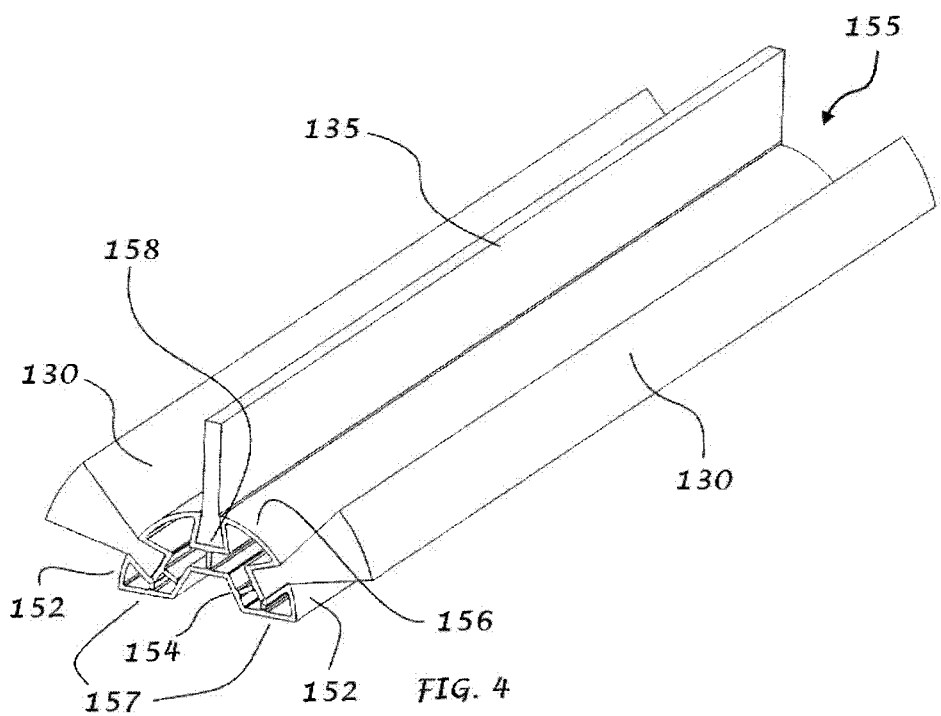
FIG. 4 is a perspective view of one of four split core members making up the stripper roller shown in FIG. 3.

With continued reference to FIG. 3 and additional reference to FIG. 4, the core of the stripper roller 150 in the present embodiment is split angularly into semicircular halves, each of which subtends an angle of approximately 180 degrees, and is moreover segmented axially into cylindrical halves, each of which is approximately half the length of the stripper roller 150. That is, the stripper roller 150 of FIG. 3 is made up of four of the split/segmented core members 155 shown in FIG. 4. Since there are two stripper rollers 150 in the stripper roller subassembly 100 shown in FIG. 2, it would take eight of the split/segmented core members 155 shown in FIG. 4 to assemble the two stripper rollers 150 in the stripper roller subassembly 100 shown in FIG. 2.

What is meant here by a core is an elongated member at least partially containing a stripper roller shaft 120 and having an outside peripheral surface from which brush(es) 130 and/or batt(s) 135 may extend. What is meant here by a split core is a core made up of members whose cross-sectional profiles respectively combine to form the cross-sectional profile of the assembled core. As the core in the present embodiment is cylindrical, its cross-sectional profile is circular, and the split-core members, respectively having semicircular cross-sectional profiles in the present embodiment, combine to form the circular cross-sectional profile of the assembled core of the present embodiment. What is meant here by a segmented core is a core that is divided axially into a number of members whose lengths respectively add up to the approximate length of the assembled core. As the core in the present embodiment is made up of two segments separated by a mid cap 170, the lengths of these two segments respectively add up to the approximate length of the assembled core.

Pairs of the split/segmented core members 155 shown in FIG. 4 are arranged in mutually opposed fashion so as to sandwich a hexagonally keyed shaft 120. Brushes 130 and batts 135 extend radially from the outside peripheral surface of the split core 155. Furthermore, the core in the embodiment shown in FIG. 3 is divided axially into two segments, so that there are a total of four split/segmented core members 155 in the stripper roller 150 of FIG. 3. In the present embodiment, pairs of these split/segmented core members 155 face each other in diametrically opposed fashion so as to form cylindrical segments that capture the stripper roller shaft 120 centrally in the axial region therewithin.

One of the four split/segmented core members 155 making up the stripper roller 150 of the present embodiment is shown in FIG. 4. The split/segmented core member 155 shown in FIG. 4 might, for example, be an extruded part made of aluminum or other suitable material. Although shown as having various hollow channels in FIG. 4, this is merely for maximizing strength while minimizing amount of material employed, and so, except as otherwise described, there is no particular objection to employment of split/segmented core members 155 that are solid or filled.

At the inside peripheral surface of the split/segmented core members 155, there are shaft engagement surfaces 154 permitting keyed engagement with the shaft 120 when assembled. Since, in the present embodiment, the shaft 120 has a hexagonal cross-section, these shaft engagement surfaces 154 here take the form of hexagonal faces having dimensions that are the same or slightly larger than the corresponding dimensions of the shaft 120.

The split/segmented core member 155 shown in FIG. 4 has core mating surfaces 157 that abut against corresponding core mating surfaces 157 of one or more other split/segmented core members 155 during assembly of the stripper roller 150 as described in more detail below.

The outside peripheral surface of the split/segmented core member 155 has a plurality of recesses 158 for receiving brushes 130 and/or batts 135. In the present embodiment, the brushes 130 and/or batts 135 are removable, the dovetail-like profile of each recess 158 serving as an interlocking feature permitting a brush 130 or batt 135 to be slidingly inserted or removed by movement axially from an end of the split/segmented core member 155 but affording resistance to accidental removal by movement radially or rotationally as a result of tugging action or other such force exerted thereon during the course of normal harvester operation. In the present embodiment, note that there are six such recesses 158 for brushes 130 and/or batts 135, the recesses 158 (and thus the brushes 130 and/or batts 135 when mounted therein) being arranged angularly about the axis of the assembled stripper roller 150 such that the planes of the brushes 130 and/or batts 135 are respectively perpendicular to the planes of the hexagonal shaft engagement surfaces 154, which is to say that the planes of the brushes 130 and/or batts 135 respectively bisect the central angles (having the axis of the shaft 120 as vertices) that intersect the corners of the hexagonal shaft engagement surfaces 154. Moreover, note that since the split/segmented core member 155 has a semicircular cross-sectional profile, interruption of the outside circumferential surface of the split/segmented core member 155 by the six recesses 158 results in formation of six arcuate regions 156 in the "valleys" between adjacent pairs of brushes 130 and/or batts 135 in the assembled stripper roller 150. Furthermore, in the present embodiment, arrangement of the recesses 158 about the axis of the split/segmented core member 155 is such that two arcuate half-regions 152 are respectively formed adjacent to the core mating surfaces 157.

As can be seen at FIG. 3, the split/segmented core members 155 in the present embodiment are held together by two end caps 160 and a mid cap 170. At each end of the shaft 120, one of the end caps 160 engages with and holds together the exterior ends of an opposed pair of split/segmented core members 155. At a point midway (not necessarily the exact midpoint) along the length of the shaft 120, the mid cap 170 engages with and holds together the interior ends of all four split/segmented core members 155.

Figure 5:
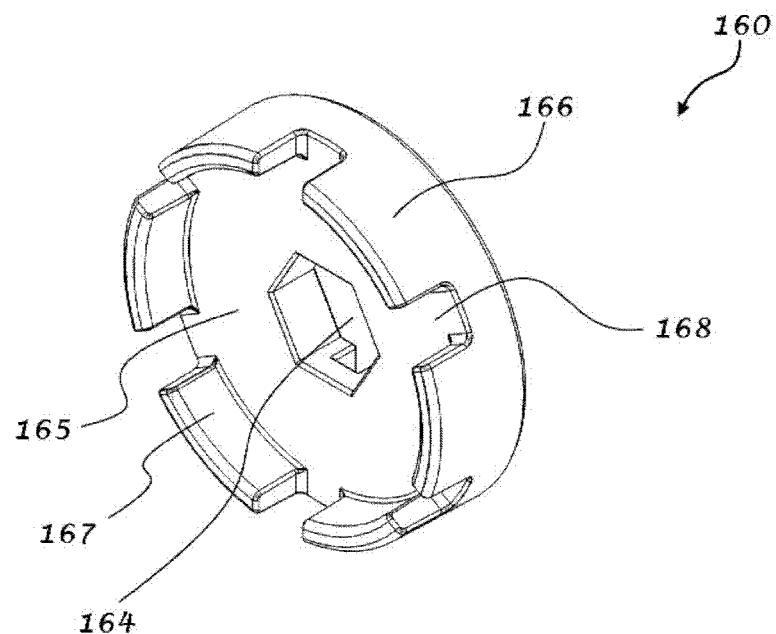
FIG. 5 is a perspective view of one of two end caps used to hold the four split core members together on the shaft of the stripper roller shown in FIG. 3.

One of the two end caps 160 of the present embodiment is shown in FIG. 5. Both of the end caps 160 are identical but only one is shown and described for convenience.

As can be seen at FIG. 5, each end cap 160 in the present embodiment approximates the shape of a cylinder that is open at one end. That is, the end cap 160 is an open-ended cylinder having a closed end and an open end. Six axially directed cutouts 168 extending from the open end of the cylinder-like end cap 160 interrupt a region corresponding to the wall of the cylinder to form six spider-like fingers 166 that project from a planar end wall 165 corresponding to the closed end of the cylinder. The axial cutouts 168 provide clearance for the brushes 130 and/or batts 135 that are inserted within the recesses 158 of the split/segmented core member 155 when assembled. The inner surfaces 167 of the spider-like fingers 166 of the end cap 160 are designed to mate with the outer surfaces of the arcuate regions 156 at the outside circumferential surface of the split/segmented core member 155.

The end wall 165 in the end cap 160 of the present embodiment has a hexagonal central hole 164. Comparing FIGS. 4 and 5, it can be seen that keying of the central hole 164 in the end cap 160 causes the spider-like fingers 166 to be arranged angularly about the axis of the assembled stripper roller 150 so as to permit the spider-like fingers 166 of the end cap 160 to mate with the arcuate regions 156 formed in the "valleys" between adjacent pairs of brushes 130 and/or batts 135 in the assembled stripper roller 150. Furthermore, this keying of the central hole 164 in the end cap 160 causes the spider-like fingers 166 to be arranged angularly about the axis of the assembled stripper roller 150 such that a line drawn perpendicular to the axis of the shaft 120 and through a corner of the hexagonal shaft 120 would bisect the corresponding arcuate region 156. Moreover, this keying of the central hole 164 in the end cap 160 causes the plane of each "seam" between adjacent arcuate half-regions 152 following assembly of the split/segmented core members 155 into a stripper roller 150 to approximately bisect the arc of the corresponding spider-like finger 166. Although the foregoing angular relationships have been described with reference to a central hole 164 that engages in keyed fashion with the shaft 120, note that foregoing angular relationships between the spider-like fingers 166, the arcuate regions 156, and the brushes 130 and/or batts 135 may apply even in embodiments in which the central hole 164 is not keyed to the shaft 120. That is, where the assembled stripper roller 150 can be made to rotate in rigid accompaniment to rotation of the shaft 120 without the need for a keyed end cap 160 (this being possible in some embodiments, for example, by virtue of the keyed shaft engagement surfaces 154 at the inside peripheral surface of the assembled stripper roller 150), it will in general still be possible to mutually align the spider-like fingers 166, the arcuate regions 156, and the brushes 130 and/or batts 135 as described above even when the end cap 160 has, for example, an oversized circular or otherwise unkeyed clearance hole in place of the hexagonal central hole 164 shown in the drawing.

The end wall 165 corresponding to the closed end of the cylinder contains a hexagonal central hole 164 with dimensions similar to the dimensions of the shaft engagement surfaces 154 at the inside peripheral surface of the assembled stripper roller 150 for capturing the shaft 120 therewithin. However, whereas the shaft engagement surfaces 154 at the inside peripheral surface of the assembled stripper roller 150 are preferably dimensioned to hold the shaft 120 tightly therewithin for keyed engagement, the central hole 164 of at least one of the end caps 160 is preferably dimensioned slightly larger than the shaft 120 so as to allow at least that end cap 160 to slide axially without binding along the shaft 120 to facilitate servicing (including change or replacement of brushes 130 and/or batts 135) by ordinary persons in the field without access to special tools. For example, in the description given below, since disassembly and reassembly during change or replacement of brushes 130 and/or batts 135 is carried out from the end of the stripper roller 150 that is elevated when the harvester is in operation (the end of the stripper roller 150 appearing at the right in FIG. 2 and at the left in FIG. 3), it would be at least this end cap 160 that preferably has a central hole 164 that is dimensioned slightly larger than the shaft 120. Note that in some embodiments in which the central hole 164 need not be keyed to the shaft 120 to locate the spider-like fingers 166 relative to the arcuate regions 156 or to assist in causing the assembled core to rotate in rigid accompaniment to rotation of the shaft 120, there is no particular objection to employment of a central hole 164 of any desired shape so long as it provides clearance to slide easily along the shaft 120.

Figure 6:
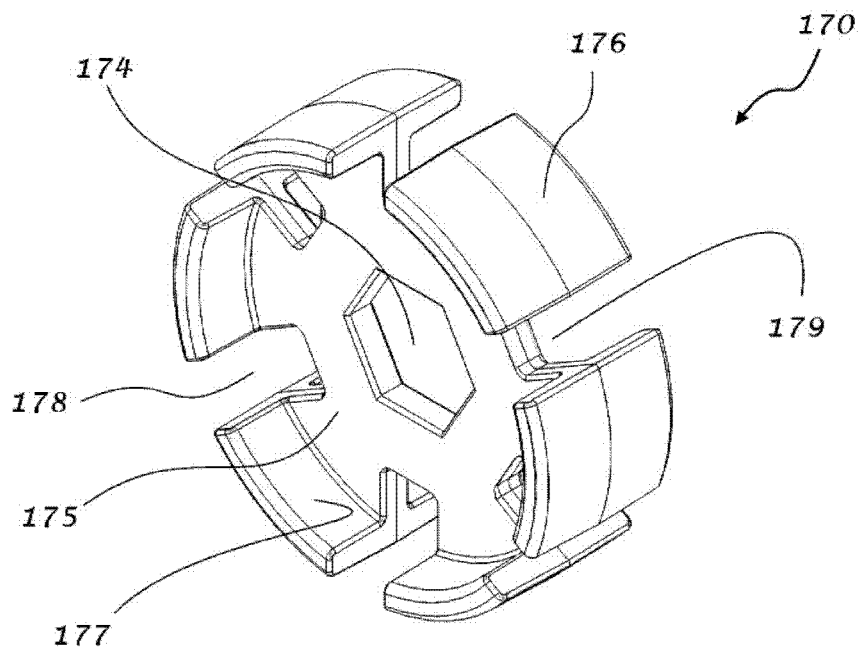
FIG. 6 is a perspective view of a mid cap used to hold the four split core members together on the shaft of the stripper roller shown in FIG. 3.

The mid cap 170 is shown in FIG. 6. The mid cap 170 in the present embodiment resembles two end caps 160 arranged with their closed ends abutting and respectively facing inward, toward the interior, in mutually opposed fashion, and with their open ends facing outward, toward the exterior, in mutually opposite directions. That is, the mid cap 170 approximates a shape that is formed when two cylinders, respectively open at one end, are joined together such that their closed ends mutually abut. The mid cap 170 is an open-ended cylinder having two open ends and an interior wall 175 formed as if by juxtaposition of the mutually opposed end walls 165 of two end caps 160, so that the interior wall 175 serves as a plane of symmetry for the two end-cap-like portions to either side thereof that are mirror images of each other formed as if by reflection across the interior wall 175. The interior wall 175 in the mid cap 170 of the present embodiment has a hexagonal central hole 174.

Note, however, that although the mid cap 170 is described for convenience as being formed as if by juxtaposition of two end caps 160, and in some embodiments it may even be possible to substitute two end caps 160 arranged back-to-back for the mid cap 170 (the "back" of each end cap 160 here corresponding to the closed end of that cylinder-like end cap 160), the mid cap 170 in the present embodiment differs in several respects from mere juxtaposed end caps 160. For example, whereas two end caps 160 arranged back-to-back would be independent and separable from each other, it is preferred in the present embodiment that there be a common interior wall 175 between the two symmetrically outwardly directed portions of the mid cap 170. Alternatively, if two end caps 160 are arranged back-to-back to form the mid cap 170, it is preferred that the backs of the end caps 160 be bonded to each other so as to join the two rigidly together. Furthermore, whereas the wall thickness of the interior wall 175 that would be formed if two end caps 160 were arranged back-to-back would be twice the wall thickness of the end wall 165 of each end cap 160, while there is no particular objection to employment of any suitable wall thickness at the interior wall 175 of the mid cap 170, including a wall thickness that is twice the wall thickness of the end wall 165 of the end cap 160, there is no particular need for the wall thickness of the interior wall 175 of the mid cap 170 to be twice the wall thickness of the end wall 165 of the end cap 160.

At the mid cap 170 shown in FIG. 6, six axially directed cutouts 178, extending continuously from one open end of the cylinder-like mid cap 170 to the other, interrupt a region corresponding to the wall of the cylinder to form six pairs of spider-like fingers 176 that project to either side of the planar interior wall 175 located at the approximate midpoint along the axis of the cylinder. The spider-like fingers 176 of the mid cap 170 have inner surfaces 177 similar to the inner surfaces 167 of the spider-like fingers 166 of the end cap 160, described above. The axial cutouts 178 provide clearance for the brushes 130 and/or batts 135 that are inserted within the recesses 158 of the split/segmented core member 155 when assembled. In addition to the axial cutouts 178 extending axially in the region corresponding to the cylinder wall, the mid cap 170 has radial cutouts 179 extending radially in the plane of the interior wall 175. The radial cutouts 179 respectively follow the planes of the brushes 130 and/or batts 135 in the assembled stripper roller 150 and allow the brushes 130 and/or batts 135 to extend continuously across the mid cap 170. Where a gap between brushes and/or batts is not objectionable or continuously extending brushes and/or batts may be implemented in some other way, the radial cutouts 179 may be omitted in some embodiments. Conversely, while absence of radial cutouts in the end caps 160 helps to hold the brushes 130 and/or batts 135 in place and keep them from sliding endwise off the stripper roller 150, where this can be accomplished by other means there is no particular objection to employment of end caps 160 that have radial cutouts.

As function of the central hole 174 and the spider-like fingers 176 of the mid cap 170 is similar to function of the central hole 164 and the spider-like fingers 166 of the end caps 160 described above, like parts are given like-numbered reference numerals and description thereof is omitted for brevity. Note that the central hole 174 of the mid cap 170 is preferably dimensioned slightly larger than the shaft 120 so as to allow that mid cap 170 to slide axially without binding along the shaft 120 to facilitate servicing (including change or replacement of brushes 130 and/or batts 135) by ordinary persons in the field without access to special tools. Note, in particular, that the description given above with respect to alignment of the spider-like fingers 166 of the end caps 160 also applies to alignment of the spider-like fingers 176 of the mid cap 170, including the angular relationships that preferably exist between the spider-like fingers 166, 176, the arcuate regions 156, and the brushes 130 and/or batts 135, with or without keyed engagement of the central hole 164, 174 with the shaft 120, in the assembled stripper roller 150.

When the stripper roller 150 is in its assembled configuration, the end cap 160 at one end (shown at left in FIG. 2 but shown at right in FIG. 3) of the shaft 120 abuts and is kept from sliding off therefrom by a fixed (permanent) stop 195. Although described as a permanent or nonremovable stop 195, there is no particular objection to employment of a removable stop or retainer at this end of the shaft 120. For example, a c-ring, e-ring, or other such circlip, retaining ring, or snap ring may be used in place of the nonremovable stop 195.

Furthermore, at the other end (shown at right in FIG. 2 but shown at left in FIG. 3) of the shaft 120 there is a hole 125 into which a cotter pin 115 is inserted when the stripper roller 150 is in its assembled configuration. Although a hole 125 and cotter pin 115 are shown in the drawing, any other suitable removable stop may be employed.

Thus, the end cap 160 at least one end of the shaft 120 in the assembled stripper roller 150 is easily removable using only a commonly available tool, such as a simple pair of pliers in the example of the cotter pin 115 given above, so as to permit easy disassembly for change or replacement of brushes 130 and/or batts 135 in the field. Where the end cap 160 at one end of the shaft 120 is easily removable due to presence of a cotter pin 115 or other such easily removable fixture and the end cap 160 at the other end of the shaft 120 is nonremovable due to presence of a nonremovable stop 195 or other such permanent or hard-to-remove fixture, it is preferred that the removable end cap 160 be at the end of the shaft 120 that is elevated when the harvester is in operation, as shown in the drawings. The reason for this is to allow gravity to assist operations when manually sliding parts down the shaft 120 during changeover or replacement of brushes 130 and/or batts 135 in the field.

Disassembly and reassembly for changing or replacement of brushes 130 and/or batts 135 will now be described with reference to FIG. 3. In the description that follows, a configuration such as that shown in FIG. 3, in which four split/segmented core members 155 are held together by two end caps 160 and one mid cap 170, will be assumed to exist. This being the case, the core segment having the pair of opposed split/segmented core members 155 closest to the cotter pin 115 in the assembled stripper roller 150 (appearing at left in FIG. 3) will be referred to as the near segment, and the core segment having the pair of opposed split/segmented core members 155 farthest from the cotter pin 115 in the assembled stripper roller 150 (appearing at right in FIG. 3) will be referred to as the far segment. Similarly, the near end of the shaft 120 will be taken to be the end of the shaft 120 that is closest to the cotter pin 115 (or hole 125), and the far end of the shaft 120 will be taken to be the end of the shaft 120 that is farthest from the cotter pin 115 (or hole 125). Moreover, the terms "near" and "far" as applied to other parts are defined similarly.

To disassemble the stripper roller 150, the cotter pin 115 is removed from the hole 125 in the shaft 120. Once the cotter pin 115 has been removed from the hole 125, clearance on the side of the hole 125 away from the near end cap 160 and near split/segmented core members 155 permits the near end cap 160 to be pulled away and separated from the near ends of the near pair of opposed split/segmented core members 155, causing the inner surfaces 167 of the spider-like fingers 166 of the near end cap 160 to disengage from the arcuate regions 156 on the near ends of the near pair of opposed split/segmented core members 155, and moreover, permits the mid cap 170 to be pulled away and separated from the far ends of the near split/segmented core members 155, causing the inner surfaces 177 of the spider-like fingers 176 projecting from the near side of the mid cap 170 to disengage from the arcuate regions 156 on the far ends of the near split/segmented core members 155. With the near end cap 160 and the near side of the mid cap 170 disengaged from the near pair of opposed split/segmented core members 155, the near pair of opposed split/segmented core members 155 can be mutually separated and removed from the shaft 120 captured therewithin, permitting change and/or replacement of brushes 130 and/or batts 135. Furthermore, with the additional clearance created as a result of removal of the near pair of opposed split/segmented core members 155, the far pair of opposed split/segmented core members 155 can be easily removed in similar fashion by disengaging the far side of the mid cap 170 and the far end cap 160 therefrom, mutually separating the far pair of opposed split/segmented core members 155, and removing the far pair of opposed split/segmented core members 155 from the shaft 120 captured therewithin.

Alternatively, the far pair of opposed split/segmented core members 155 might have been mutually separated and removed from the shaft 120 captured therewithin without first having mutually separated and removed the near pair of opposed split/segmented core members 155 if, after removing the cotter pin 115 from the hole 125, the near segment, which is to say the near end cap 160, near pair of opposed split/segmented core members 155, and near side of the mid cap 170, had been slid along the shaft 120 as a unit so as to disengage the far side of the mid cap 170 and the far end cap 160 from the far pair of opposed split/segmented core members 155.

With the cotter pin 115, the end caps 160, the mid cap 170, and the split/segmented core members 155 removed from the shaft 120, the stripper roller 150 may be assembled by sliding an end cap (which will become the far end cap) 160 onto the shaft 120 from the near end of the shaft 120, with the far end cap 160 oriented such that the end wall 165 (closed) side of the end cap 160 goes onto the shaft 120 first and the spider-like finger 166 (open) side of the end cap 160 follows. The far end cap 160 is then slid along the shaft 120 until it comes to rest against the nonremovable stop 195. A pair of split/segmented core members (which will become the far pair of opposed split/segmented core members) 155 are arranged in mutually opposed fashion so as to capture the shaft 120 therewithin, and the far ends of the far pair of opposed split/segmented core members 155 are inserted within the far end cap 160 so as to cause the arcuate regions 156 on the far ends of the far pair of opposed split/segmented core members 155 to be captured within and held together by the inner surfaces 167 of the spider-like fingers 166 of the far end cap 160. The mid cap 170 is then slid along the shaft 120, and the near ends of the far pair of opposed split/segmented core members 155 are inserted within the far side of the mid cap 170 so as to cause the arcuate regions 156 on the near ends of the far pair of opposed split/segmented core members 155 to be captured within and held together by the inner surfaces 177 of the spider-like fingers 176 of the far side of the mid cap 170. A pair of split/segmented core members (which will become the near pair of opposed split/segmented core members) 155 are arranged in mutually opposed fashion so as to capture the shaft 120 therewithin, and the far ends of the near pair of opposed split/segmented core members 155 are inserted within the near side of the mid cap 170 so as to cause the arcuate regions 156 on the far ends of the near pair of opposed split/segmented core members 155 to be captured within and held together by the inner surfaces 177 of the spider-like fingers 176 of the near side of the mid cap 170.

Another end cap (which will become the near end cap) 160 is slid onto the shaft 120 from the near end of the shaft 120, with the near end cap 160 oriented such that the spider-like finger 166 (open) side of the end cap 160 goes onto the shaft 120 first and the end wall 165 (closed) side of the end cap 160 follows, and the near ends of the near pair of opposed split/segmented core members 155 are inserted within the near end cap 160 so as to cause the arcuate regions 156 on the near ends of the near pair of opposed split/segmented core members 155 to be captured within and held together by the inner surfaces 167 of the spider-like fingers 166 of the near end cap 160. The cotter pin 115 is then inserted into the hole 125 and its ends splayed out so as to keep the assembled stripper roller 150 in place on the shaft 120. Note that instead of inserting the cotter pin 115 into the hole 125, it is possible to use a stop pin similar to the nonremovable stop 195, a rapid twist-lock clamping arrangement, or any other suitable fixture to hold the assembled parts together on the shaft 120.

Figure 7:
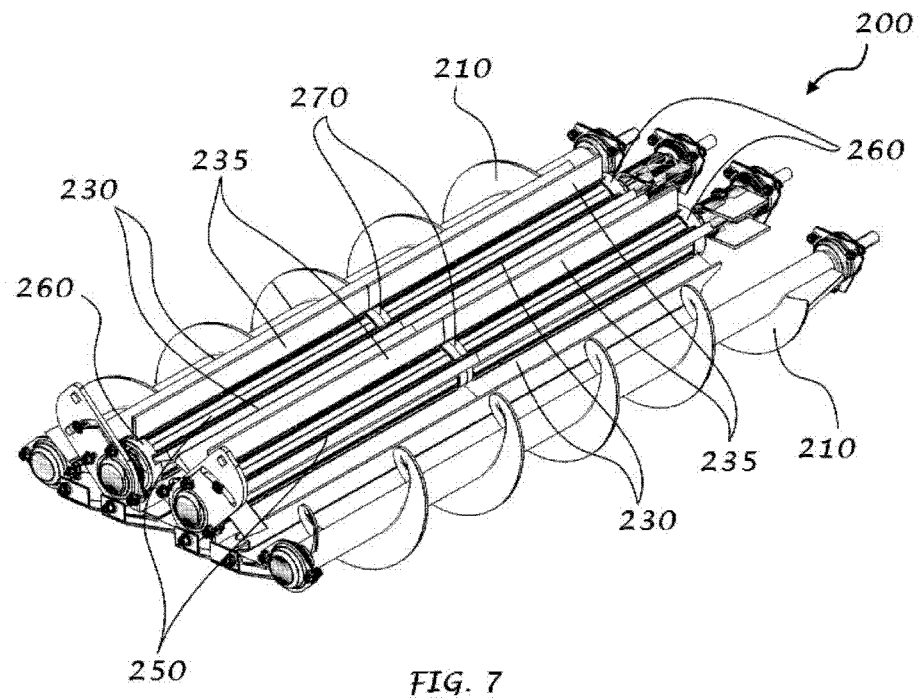
FIG. 7 is a perspective view of a stripper roller subassembly for an agricultural stripper unit in accordance with a second embodiment of the present invention.

Referring to FIG. 7, this shows a stripper roller subassembly 200 in accordance with a second embodiment of the present invention. Like the stripper roller subassembly 100 in accordance with the first embodiment shown in FIG. 2, the stripper roller subassembly 200 shown in FIG. 7 is part of an agricultural stripper unit in an agricultural harvester such as 7460 Cotton Stripper® (registered trademark of John Deere & Company of Moline, Ill., USA) manufactured by John Deere & Company of Moline, Ill., USA. The stripper roller subassembly 200 of the second embodiment being in many respects similar to the stripper roller subassembly 100 of the first embodiment, like parts are given like-numbered reference numerals and description below focuses on those aspects that are different.

Like the stripper roller subassembly 100 of the first embodiment shown in FIG. 2, the stripper roller subassembly 200 of the second embodiment is typically oriented in inclined or upright fashion within the cotton stripper or other such agricultural harvester such that the shafts of the stripper rollers 250 and augers 210 have one end disposed toward the ground or plant level and the other end elevated with respect thereto. At FIGS. 7 through 15, the end disposed toward the ground when the harvester is in operation is shown at left in the drawing, and the end that is elevated when the harvester is in operation is shown at right in the drawing.

Figure 8:
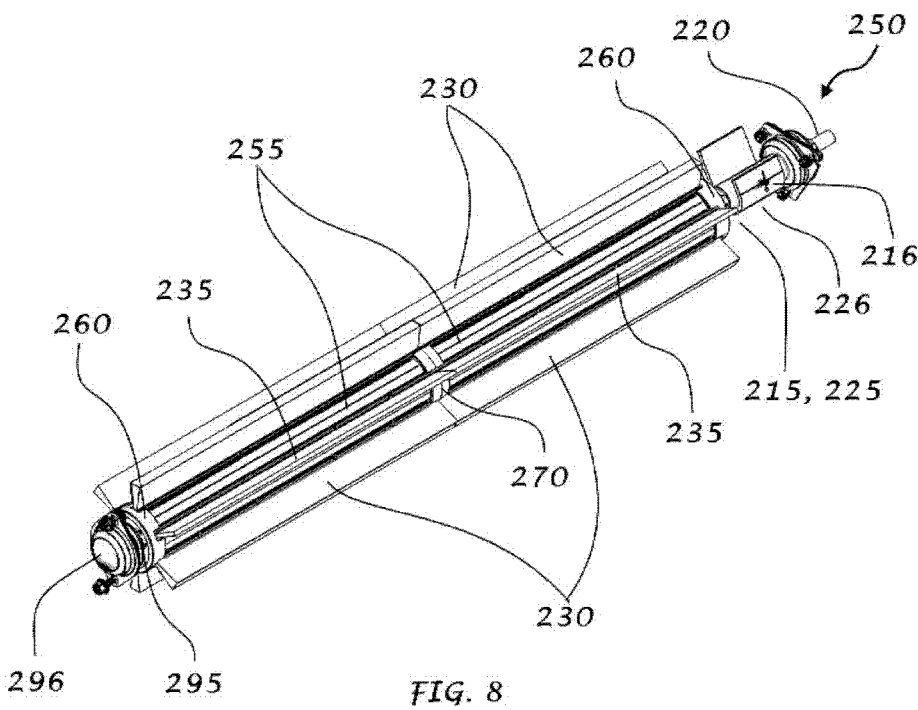
FIG. 8 is a perspective view of one of the two stripper rollers present in the stripper roller subassembly of the second embodiment shown in FIG. 7.

FIG. 8 shows one of the two stripper rollers 250 present in the stripper roller subassembly 200 of FIG. 7. Whereas the stripper roller 150 in accordance with the first embodiment was shown in FIG. 3 such that the end disposed toward the ground when the harvester is in operation was shown at right and the end that is elevated when the harvester is in operation was shown at left, because the stripper roller 250 in accordance with the second embodiment is shown in FIG. 8 such that the end disposed toward the ground when the harvester is in operation is shown at left and the end that is elevated when the harvester is in operation is shown at right, a cotter pin 215 and a hole 225 in the shaft 220 into which the cotter pin 215 is inserted so as to hold an end cap 260 in place when the stripper roller 250 is in its assembled configuration is hidden from view between that end cap 260 and a flap 226. Note that a cotter pin 216 that holds the flap 226 in place is visible in FIG. 8, but this cotter pin 216 is different from the cotter pin 215 that holds the end cap 260 (and parts on the far side therefrom) in place on the shaft 220.

Figure 9:
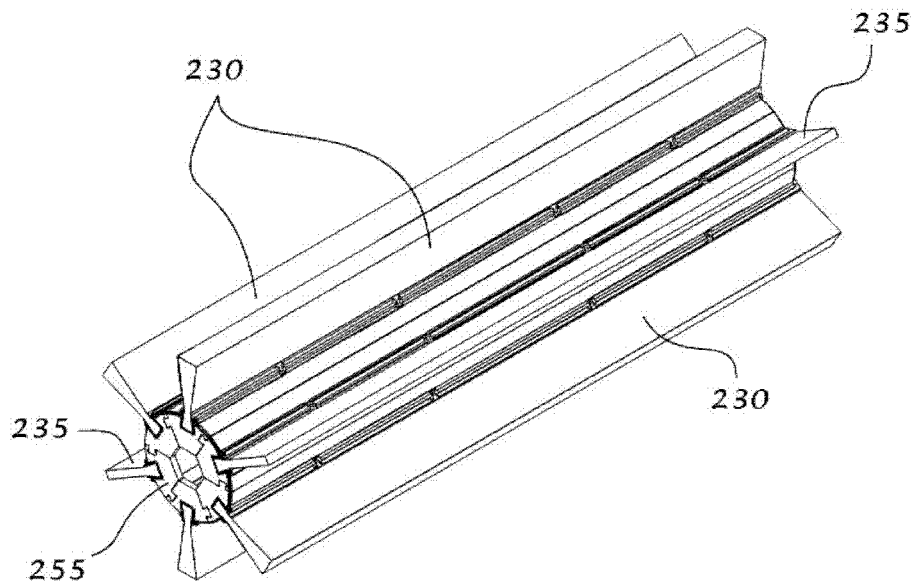
FIG. 9 is a perspective view of one of two axial segments making up the stripper roller shown in FIG. 8.
Figure 10:
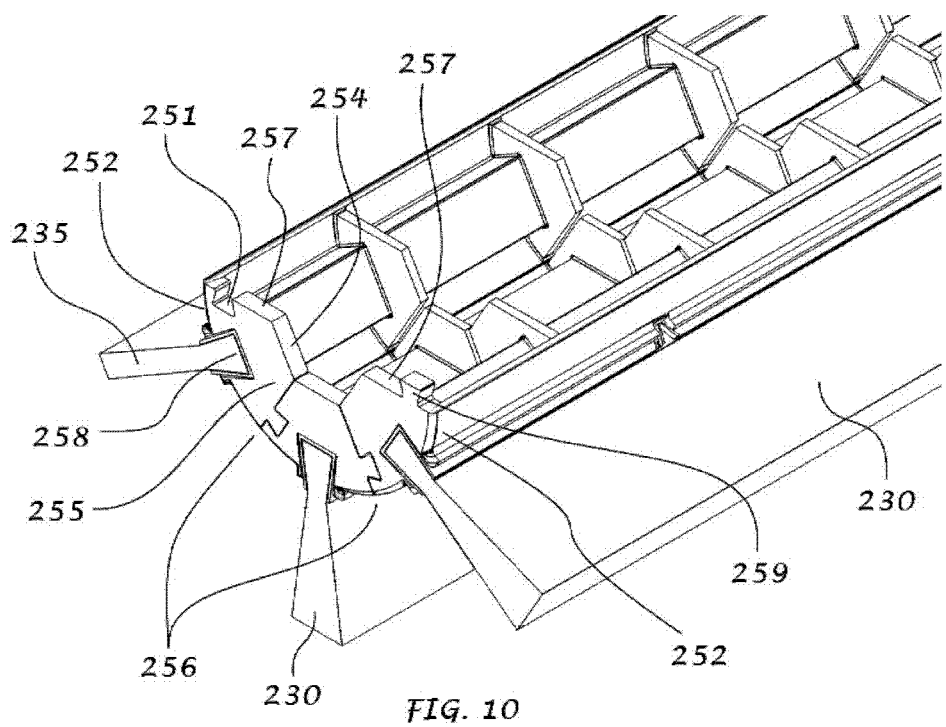
FIG. 10 is a partial perspective view of the segment shown in FIG. 9 in a partially assembled state.

Note that the shaft 220 and other parts are omitted for clarity at FIGS. 9 and 10. Furthermore, note that the segment shown in FIG. 10 is shown in a partially assembled state.

Figure 11:
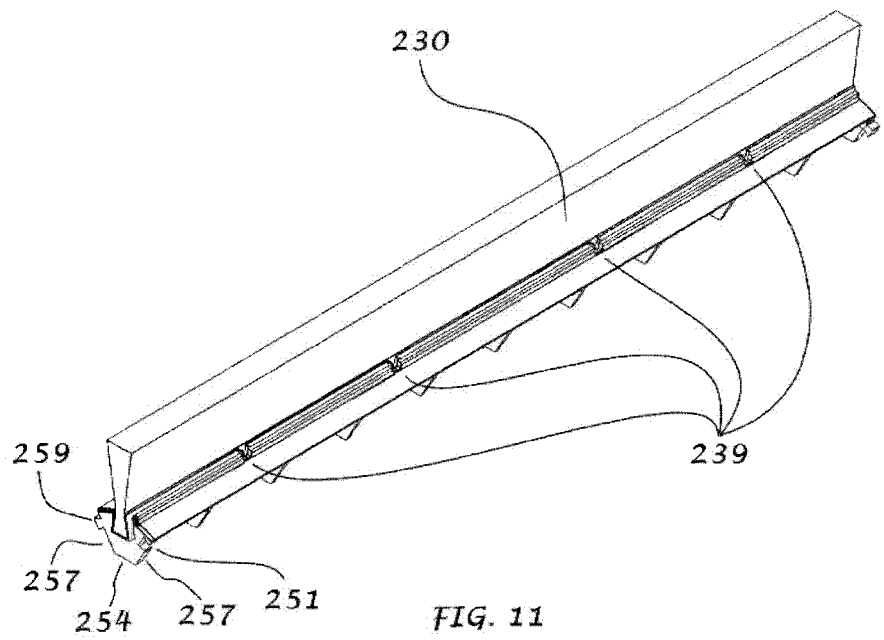
FIG. 11 is a perspective view of a brush split/segmented core member.
Figure 12:
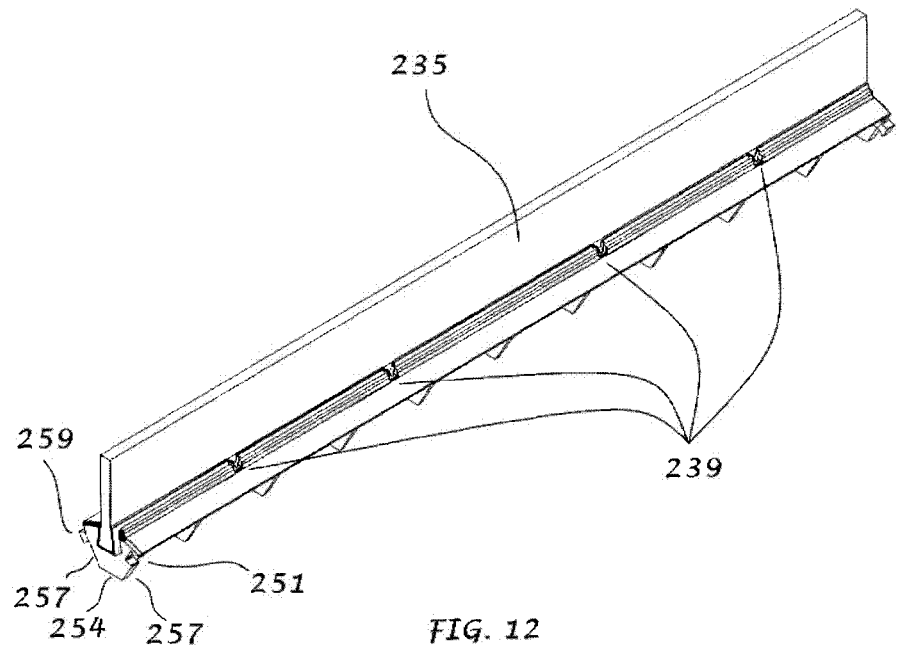
FIG. 12 is a perspective view of a batt split/segmented core member.

With continued reference to FIG. 8 and additional reference to FIGS. 9 through 12, the core of the stripper roller 250 in the present embodiment is split angularly into wedge-like strips, each of which subtends an angle of approximately 60 degrees, and is moreover segmented axially into cylindrical halves, each of which is approximately half the length of the stripper roller 250. That is, the stripper roller 250 is made up of twelve split/segmented core members 255, some of which are brush split/segmented core members 255 as shown in FIG. 11, and some of which are batt split/segmented core members 255 as shown in FIG. 12. The body of the split/segmented core member 255 might, for example, be an extruded part made of thermoplastic or thermosetting resin or other suitable material. Although shown as having ribbing in various arrangements in FIGS. 10 and 15, this is merely for maximizing strength while minimizing amount of material employed, and so, except as otherwise described, there is no particular objection to employment of split/segmented core members 255 that are solid or filled or which employ ribbing or other such reinforcement in a different arrangement. In particular, while it is preferred that periodically (in the case of a ribbed split/segmented core member 255) or continuously (in the case of a solid or filled split/segmented core member 255) along the length of the split/segmented core member 255 hexagonal shaft engagement surfaces similar to the shaft engagement surfaces 254 at the ends of the split/segmented core member 255 be formed at the inside peripheral surface of the assembled split/segmented core member 255, there is no particular objection to an embodiment in which such surfaces are formed only at the ends of the split/segmented core member 255.

Figure 13:
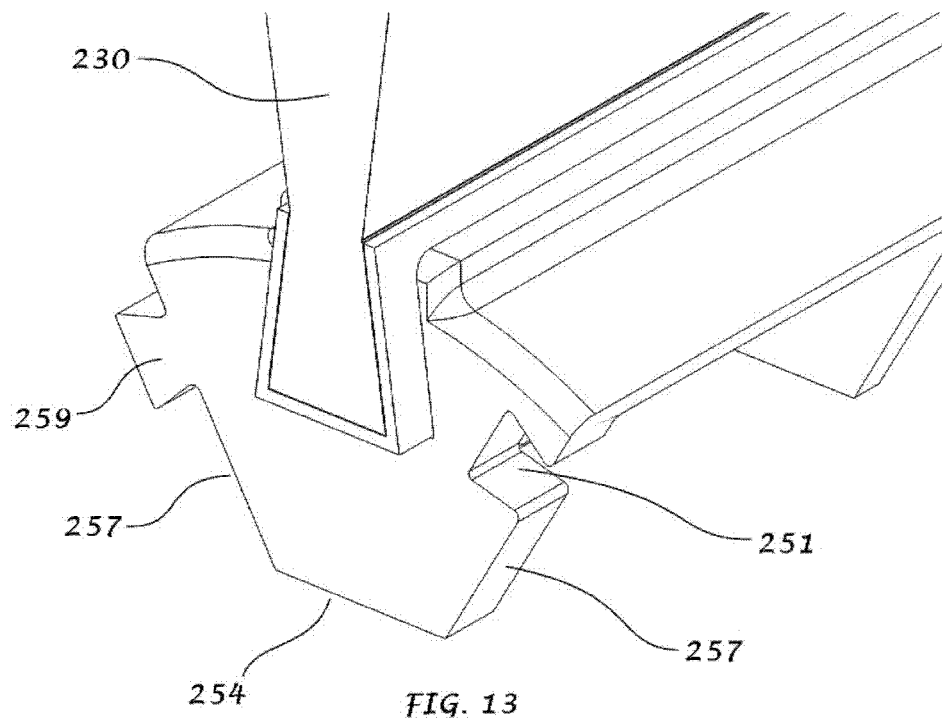
FIG. 13 is an enlarged partial perspective view of one end of the brush split/segmented core member of FIG. 11.

Referring to FIGS. 11 and 12, and as best seen in the enlarged view at FIG. 13, at either end of each split/segmented core member 255, there is a male projection 259 on a side in one angular direction (here the counterclockwise direction as seen in FIG. 10) and a female recess 251 on a side in the opposite angular direction (here the clockwise direction as seen in FIG. 10). The male projection 259 of each split/segmented core member 255 is designed in the present embodiment to be inserted in dovetail-like fashion into the female recess 251 of an adjacent split/segmented core member 255, with this dovetail-like interlocking arrangement continuing as one proceeds angularly about the shaft 220 until the shaft 220 is captured within the hexagonal or otherwise keyed space formed by the assembled split/segmented core members 255. That is, at the inside peripheral surface of the assembled split/segmented core members 255, there are shaft engagement surfaces 254 permitting keyed engagement with the shaft 220. Since, in the present embodiment, the shaft 220 has a hexagonal cross-section, these shaft engagement surfaces 254 here combine during assembly to form hexagonal faces having dimensions that are the same or slightly larger than the corresponding dimensions of the shaft 220. Furthermore, the split/segmented core member 255 has core mating surfaces 257 that abut against corresponding core mating surfaces 257 of one or more other split/segmented core members 255 during assembly of the stripper roller 250. In the present embodiment, these split/segmented core members 255 are arranged angularly about the shaft 220 in interlocking fashion to form cylindrical segments that capture the stripper roller shaft 220 centrally in the axial region therewithin. For example, the core in the embodiment shown in FIG. 8 comprises two of the segments shown in FIG. 9. Since there are two stripper rollers 250 in the stripper roller subassembly 200 shown in FIG. 7, it would take twenty-four of the split/segmented core members 255 shown in FIGS. 11 and 12 to assemble the two stripper rollers 250 in the stripper roller subassembly 200 shown in FIG. 7.

In the present embodiment, each split/segmented core member 255 has a brush 230 or batt 235 extending radially from the outside peripheral surface thereof, a brush split/segmented core member 255 being shown in FIG. 11 and a batt split/segmented core member 255 being shown in FIG. 12. In the present embodiment, each brush or batt split/segmented core member 255 contains a brush or batt 230, 235 having a strip backing 236 made of metal or other suitable material that is inserted within an insert-receiving groove 237 formed from the material of the split/segmented core member 255, which may, for example, be thermoplastic or thermosetting resin.

Figure 14:
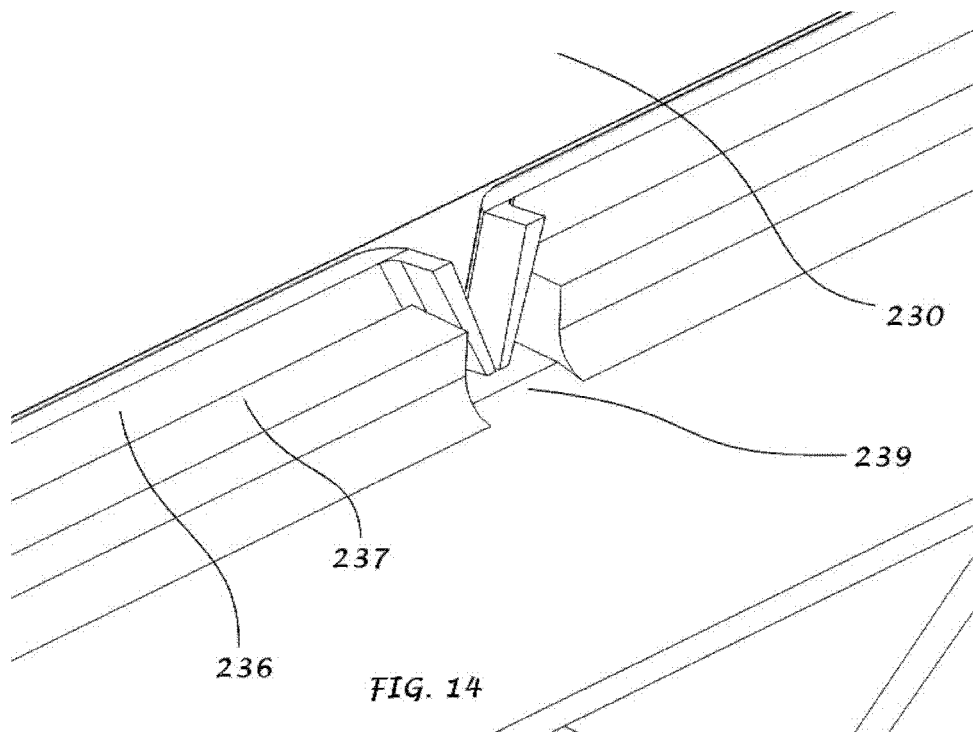
FIG. 14 is an enlarged partial perspective view showing a location midway along the length of the brush split/segmented core member of FIG. 11.

Describing the way this strip backing 236 is mounted within the insert-receiving groove 237 of the split/segmented core member 255 in one embodiment, this is best seen at the enlarged views of FIGS. 13 and 14. That is, the outside peripheral surface of each split/segmented core member 255 has a recess 258 for receiving a brush 230 or a batt 235. The dovetail-like profile of each recess 258 serves as an interlocking feature permitting the strip backing 236, in its straight configuration prior to formation of V-shaped regions that will engage with V-shaped regions in the insert-receiving groove 237 at locations 239 by staking as described below, of a brush 230 or batt 235 to be slidingly inserted therein by movement axially from an end of the split/segmented core member 255 but affording resistance to accidental removal by movement radially as a result of tugging action or other such force exerted thereon during the course of normal harvester operation. Note that although the present embodiment employs a dovetail profile for engagement of the brushes 230 and/or batts 235 by the recesses 258, it is also possible to employ a "T" shape or other suitably shaped profile.

Furthermore, in the present embodiment, following axial sliding insertion of the straight and unstaked strip backing 236 of the brush 230 or batt 235 within the insert-receiving groove 237 of the split/segmented core member 255, staking operations are carried out periodically at locations 239 along the length of the split/segmented core member 255. During these staking operations, staking tools might be used to upset and reform the metal strip backing 236 of a brush or batt 230, 235 into the shape of a V, with these V-shaped regions of the strip backing 236 being pressed into suitable notches formed in the insert-receiving groove 237 so as to permanently insert and secure the strip backing 236 within the insert-receiving groove 237. When staking is carried out in this fashion, this prevents the strip backing 236 from being removed axially from the insert-receiving groove 237. That is, unlike the brushes 130 and/or batts 135 of the stripper roller 150 in accordance with the first embodiment, the brushes 230 and/or batts 235 of the stripper roller 250 in accordance with the second embodiment are not intended to be separately changeable or replaceable in the field, but rather each brush and/or batt split/segmented core member 255, with integral brush 230 or batt 235 permanently mounted thereon, is intended to be changed or replaced as a unit.

Referring to FIG. 10, in the present embodiment, note that brushes 230 and/or batts 235 are arranged angularly about the axis of the assembled stripper roller 250 such that the planes of the brushes 230 and/or batts 235 are respectively perpendicular to the planes of the hexagonal shaft engagement surfaces 254, which is to say that the planes of the brushes 230 and/or batts 235 respectively bisect the central angles (having the axis of the shaft 220 as vertices) that intersect the corners of the hexagonal shaft engagement surfaces 254. Moreover, note that since the split/segmented core members 255 combine to form a cylindrical outside peripheral surface, interruption of the outside circumferential surface of the combined split/segmented core members 255 by the brushes 230 and/or batts 235 results in formation of arcuate regions 256 in the "valleys" between adjacent pairs of brushes 230 and/or batts 235 in the assembled stripper roller 250. Note that with the stripper roller 250 partially assembled in the configuration shown in FIG. 10, two arcuate half-regions 252 can be seen adjacent to the exposed core mating surfaces 257.

Figure 15:
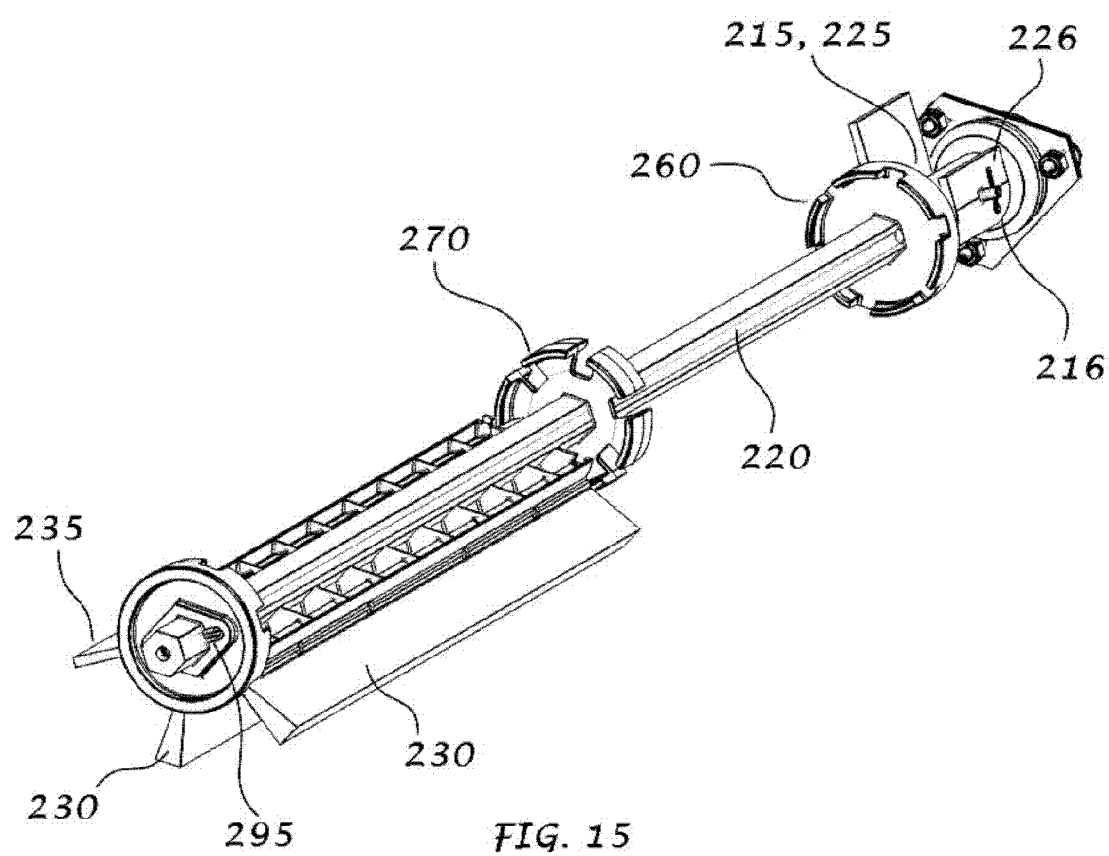
FIG. 15 is a perspective view of a partially assembled stripper roller in the stripper roller subassembly of FIG. 7.

As can be seen at FIGS. 8 and 15, the split/segmented core members 255 in the present embodiment are held together by two end caps 260 and a mid cap 270. At each end of the shaft 220, one of the end caps 260 engages with and holds together the exterior ends of six interlocking split/segmented core members 255. At a point midway (not necessarily the exact midpoint) along the length of the shaft 220, the mid cap 270 engages with and holds together the interior ends of all twelve split/segmented core members 255.

The end caps 260 and the mid cap 270 of the second embodiment being essentially identical to the end caps 160 and the mid cap 170 of the first embodiment described above, detailed description of the end caps 260 and the mid cap 270 of the second embodiment is omitted for brevity.

When the stripper roller 250 is in its assembled configuration, the end cap 260 at one end (shown at left in FIGS. 7, 8, and 15) of the shaft 220 abuts and is kept from sliding off therefrom by a fixed (permanent) stop 295. This nonremovable stop 295 is visible at FIG. 15 but is not visible at FIG. 7 or FIG. 8, being hidden behind a hub 296 in those drawings. Although described as a permanent or nonremovable stop 295, there is no particular objection to employment of a removable stop or retainer at this end of the shaft 220. For example, a c-ring, e-ring, or other such circlip, retaining ring, or snap ring may be used in place of the nonremovable stop 295.

Furthermore, at the other end (shown at right in FIGS. 7, 8, and 15) of the shaft 220 there is a hole 225 into which a cotter pin 215 is inserted when the stripper roller 250 is in its assembled configuration. Note that a cotter pin 216 that holds the flap 226 in place is visible in FIGS. 8 and 15, but this cotter pin 216 is different from the cotter pin 215 that holds the end cap 260 (and parts on the far side therefrom) in place on the shaft 220. Furthermore, note that the cotter pin 215 and the hole 225 in the shaft 220 into which the cotter pin 215 is inserted so as to hold the end cap 260 (and parts on the far side therefrom) in place when the stripper roller 250 is in its assembled configuration is hidden from view between that end cap 260 and the flap 226. Although a hole 225 and a cotter pin 215 have been mentioned, any other suitable removable stop may be employed.

Thus, the end cap 260 at least one end of the shaft 220 in the assembled stripper roller 250 is easily removable using only a commonly available tool such as a simple pair of pliers in the example of the cotter pin 215 given above so as to permit easy disassembly for change or replacement of brush and/or batt split/segmented core members 255 in the field. Where the end cap 260 at one end of the shaft 220 is easily removable due to presence of a cotter pin 215 or other such easily removable fixture and the end cap 260 at the other end of the shaft 220 is nonremovable due to presence of a nonremovable stop 295 or other such permanent or hard-to-remove fixture, it is preferred that the removable end cap 260 be at the end of the shaft 220 that is elevated when the harvester is in operation, as shown in the drawings. The reason for this is to allow gravity to assist operations when manually sliding parts down the shaft 220 during changeover or replacement of brush and/or batt split/segmented core members 255 in the field.

Disassembly and reassembly for changing or replacement of brushes 230 and/or batts 235 are essentially as described above for the first embodiment, except that in the second embodiment there are six rather than two split/segmented core members 255 making up each segment of the stripper roller 250, and the split/segmented core members 255 must be slid axially so as to engage or disengage the interlocking female recesses 251 and male projections 259 as the segment is assembled or disassembled. That is, during assembly, after sliding an end cap (which will become the far end cap) 260 onto the shaft 220 from the near end of the shaft 220 in similar fashion as was described above for the first embodiment, the shaft engagement surface 254 of a first split/segmented core member 255 might be held against a face of the hexagonal shaft 220 such that the split/segmented core member 255 is parallel with respect to the long direction of that shaft 220. A second split/segmented core member 255 might then be positioned against an adjacent face of the hexagonal shaft 220 and slid axially, for example a distance of approximately 0.2 inch, until the male projection 259 of one split/segmented core member 255 interlocks with the female recesses 251 of the adjacent split/segmented core member 255. A third split/segmented core member 255 might then be interlocked with the previous two split/segmented core members 255, with the progression continuing until the sixth split/segmented core member 255 interlocks with the first and fifth split/segmented core members 255 and the shaft 220 is captured therewithin.

Thereafter, the far ends of the six interlocked split/segmented core members 255 (which will collectively become the far segment) are inserted within the far end cap 260 so as to cause the arcuate regions 256 on the far ends of the far segment to be captured within and held together by the inner surfaces 267 of the spider-like fingers 266 of the far end cap 260. The mid cap 270 is then slid along the shaft 220, and the near ends of the far segment are inserted within the far side of the mid cap 270 so as to cause the arcuate regions 256 on the near ends of the far segment to be captured within and held together by the inner surfaces 277 of the spider-like fingers 276 of the far side of the mid cap 270. Another set of six split/segmented core members 255 (which will become the near segment) are mutually interlocked so as to capture the shaft 220 therewithin in similar fashion as was described above for the far segment again, and the far ends of the near segment are inserted within the near side of the mid cap 270 so as to cause the arcuate regions 256 on the far ends of the near segment to be captured within and held together by the inner surfaces 277 of the spider-like fingers 276 of the near side of the mid cap 270. Another end cap (which will become the near end cap) 260 is slid onto the shaft 220 in similar fashion as was described above for the first embodiment, and the near ends of the near segment are inserted within the near end cap 260 so as to cause the arcuate regions 256 on the near ends of the near segment to be captured within and held together by the inner surfaces 267 of the spider-like fingers 266 of the near end cap 260. The cotter pin 215 is then inserted into the hole 225 and its ends splayed out so as to keep the assembled stripper roller 250 in place on the shaft 220. Note that instead of inserting the cotter pin 215 into the hole 225, it is possible to use a stop pin similar to the nonremovable stop 295, a rapid twist-lock clamping arrangement, or any other suitable fixture to hold the assembled parts together on the shaft 220.

Disassembly of the stripper roller 250 is carried out in similar fashion as was described above for the first embodiment.

As described above, stripper rollers and stripper roller subassemblies in accordance with the present invention overcome one or more inadequacies of the conventional art and/or have other benefits and advantages. For example:

Weight (mass) reduction

Fewer parts. For example, with the first embodiment there is a reduction in the number of components from 61 to 22 per stripper roller, and with the second embodiment there is a reduction in the number of components from 61 to 18 per stripper roller, as compared with the conventional stripper roller subassembly in the 7460 Cotton Stripper® (registered trademark of John Deere & Company of Moline, Ill., USA) manufactured by John Deere & Company of Moline, Ill., USA.

Ease of assembly/changeover

Integral split/segmented core member replaces threaded/loose hardware of conventional stripper roller and combines multiple parts into one Interlocking features of brushes and/or batts (or integral split/segmented core members having brushes and/or batts mounted thereon) allow for quick and custom interchangeability for varying field conditions and operator preference No specialized tools required for field service That is, the stripper rollers in accordance with the first and second embodiments require no specialized hardware or tools to assemble/disassemble, an ordinary cotter pin being the only component that needs to be removed to gain access for change or replacement of brushes and/or batts (or integral split/segmented core members having brushes and/or batts mounted thereon). End caps may be secured through use of cotter pins or other such fasteners. Removal of the cotter pin and end cap at one end of the core permits brushes and/or batts to be easily removed and replaced by simply sliding the brushes and/or batts along the dovetail or other such interlocking feature groove in the core. Removal of the cotter pins and ends caps at both ends of the core permits the core to be disassembled into its component split core members. Such assembly and disassembly operations, and in particular changing of brushes and/or batts as desired to suit varying harvesting conditions, can easily be performed in the field without specialized tools other than perhaps a pair of pliers for removal of the cotter pins.

Furthermore, the stripper rollers employ split/segmented core members that mutually mate to capture a rotatable keyed shaft therewithin, these split/segmented core members being secured in place by end caps and a mid cap. In some embodiments, it is possible for the end caps and the mid cap to remain on the shaft, while nonetheless being capable of being moved axially to permit assembly and disassembly of the stripper roller. In one embodiment, interlocking tabs (male projections and female recesses) assist the operator during assembly of split/segmented core members around a hexagonal or similarly keyed shaft. In such an embodiment, the tabs connect each split/segmented core member to the adjacent split/segmented core member, thereby allowing a single operator to carry out assembly and disassembly.

Moreover, brushes and/or batts (or integral split/segmented core members having brushes and/or batts mounted thereon) may be installed in any combination to match varying field conditions as determined by the operator of the harvester.

The split/segmented core members may be manufactured by extrusion or molding from aluminum or other metal, or from a thermoplastic or thermosetting resin. The retainer caps for holding the split core members together may be molded from thermoplastic or thermosetting resin.

Although the present invention has been described in terms of examples in which end caps, mid cap, and split/segmented core members are capable of mating with a hexagonally keyed shaft, there is no particular objection to keying by other than a shaft having a hexagonal cross-sectional profile. Furthermore, although it is preferred for strength and reliability that the end caps, mid cap, and split/segmented core members all keyably engage with the shaft, in some embodiments it is sufficient for any one or more of the end caps, mid cap, and/or split/segmented core members to keyably engage with the shaft.

Although the second embodiment has been described in terms of an example in which there is a hexagonal shaft and each wedge-shaped split/segmented core member mates with a single shaft face, such that the number of wedge-shaped split/segmented core member in each segment is six (this being the number of faces of the hexagonal shaft), with the angle subtended by each split/segmented core member being the same as the angle subtended by each face of the hexagonal shaft, this need not be the case. That is, in some embodiments, there is no need for split core elements to be wedge-shaped, no need for there to be the same number of split/segmented core members as the shaft has faces, no need for one split/segmented core member to line up with one shaft face, and no need for the shaft to be hexagonal, for the shaft to be polygonal, or for the shaft to have faces. That is, in some embodiments, it is sufficient so long as the assembled core is keyed to the shaft (which is to say that the assembled core rotates in rigid accompaniment to rotation of the shaft), regardless of the manner in which that keying between shaft and assembled core takes place.

Similarly, although embodiments have been shown in which one brush or batt is present at each face of the hexagonal shaft such that there are a total of six brushes/bats per roller or roller segment, this need not be the case. That is, there is no particular objection to employment of batts/brushes in a number differing from the faces of the shaft. In fact, as indicated above, in some embodiments, there is no particular need to employ a shaft having a polygonal cross-section. Furthermore, the keying between the assembled core and the shaft can in general be implemented in any of a variety of ways, so it goes without saying that in some embodiments the number and arrangement of brushes and/or batts need not be constrained by the cross-sectional shape of the shaft.

Although interlocking features such as male projections and female recesses have been presented as an example of a way in which adjacent split/segmented core members are held together before being more permanently secured in place through use of end caps and a mid cap, in some embodiments there is no particular need to employ such male projections and female recesses. For example, in one embodiment, a single operator might still hold six split/segmented core members together without presence of male projections and female recesses as in the second embodiment by instead using a strap that is temporarily wrapped around the outside peripheral surface of the assembled split/segmented core members until they can be more permanently secured in place through use of the end caps and the mid cap.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention.

What is claimed is:

1. A stripper roller for use in a subassembly, the stripper roller comprising:
   a shaft having an axially extending length and an axis of rotation;
   a first core disposed around the shaft, the first core keyed to the shaft such that the first core is constrained to rotate around the shaft axis of rotation in rigid accompaniment with the shaft, the first core comprising a first core member and a second core member, the first core member comprising an axially extending shaft engagement surface,
      an axially extending core member mating surface configured to be disposed adjacent to a core member mating surface of the second core member, and
      an axially extending recess area disposed substantially opposite the shaft engagement surface of the first core member;
   a recess area insert having a proximal edge and a distal edge, the recess area insert proximal edge configured with an interlocking geometry disposed to slidably engage within the first core member recess area;
   a cap having a center hole configured to slidably engage around the shaft, the cap configured to engage the first core so that the cap holds the first core member mating surface adjacent to the second core member mating surface, the cap further configured to cover the end of the recess area, thereby containing the recess area insert within the recess area; and
   a stop configured to restrain the cap from sliding along the shaft.

2. The stripper roller for use in a subassembly of claim 1, wherein the recess insert is selected from the group consisting of a brush and a batt.

3. The stripper roller for use in a subassembly of claim 2, wherein the interlocking geometry comprises a dovetail joint.

4. The stripper roller for use in a subassembly of claim 2, wherein the interlocking geometry comprises a T-joint.

5. The stripper roller for use in a subassembly of claim 2, wherein the stop further comprises:
   a hole through the shaft; and
   a cotter pin configured to engage the hole.

6. The stripper roller for use in a subassembly of claim 2, wherein the cap further comprises fingers that slideably engage the first core.

7. The stripper roller for use in a subassembly of claim 6, wherein the cap is an end cap.

8. The stripper roller for use in a subassembly of claim 2, wherein the cap is a mid cap further comprising fingers that slideably engage the first core and that further slidably engage a second core.

9. The stripper roller for use in a subassembly of claim 8, wherein the recess area insert length spans the axial length of the first core and the second core.

10. The stripper roller for use in a subassembly of claim 2, wherein the shaft has a substantially hexagonally shaped cross section.

11. The stripper roller for use in a subassembly of claim 2, wherein the first core consists of two core members.

12. The stripper roller for use in a subassembly of claim 11, wherein the cross section of each core member is substantially hemispherical.

13. The stripper roller for use in a subassembly of claim 2, wherein the first core consists of six core members.

14. The stripper roller for use in a subassembly of claim 13, wherein the core member has a first core member interlocking surface and a second core member interlocking surface, the first core member interlocking surface comprising a male projection, and the second core member interlocking surface comprising a female recess.

15. A stripper roller for use in a subassembly, the stripper roller comprising:
 a shaft having an axially extending length and an axis of rotation;
 a first core disposed around the shaft, the core keyed to the shaft such that the first core is constrained to rotate around the shaft axis of rotation in rigid accompaniment with the shaft, the first core comprising a first core member and a second core member, the first core member comprising an axially extending shaft engagement surface,
 a first core member mating surface configured to be disposed adjacent to a second core member mating surface of the second core member, wherein the first mating surface comprises a male projection, and the second mating surface comprises a female recess, and
  an axially extending recess area disposed substantially opposite the shaft engagement surface of the first core member;
 a recess area insert having a proximal edge and a distal edge, the recess area insert proximal edge disposed to fixedly engage within the first core member recess area, wherein the recess insert is selected from the group consisting of a brush and a batt;
 a cap having a center hole configured to slidably engage around the shaft, the cap configured to engage the first core so that the cap holds the first core member mating surface adjacent to the second core member mating surface; and
 a stop configured to restrain the cap from sliding along the shaft.

16. The stripper roller for use in a subassembly of claim 15, further comprising a flap disposed adjacent to the shaft.

17. The stripper roller for use in a subassembly of claim 15, further comprising a hub affixed to one end of the shaft.

18. A method for manufacturing a stripper roller for use in a subassembly, comprising the steps of:
 forming the stripper roller comprising a core to be disposed around a shaft, the core comprising a plurality of core members, each core member of the plurality of core members further comprising an axially extending core member mating surface configured to abut against a corresponding core member mating surface of an adjacent core member, and an axially extending recess area;
 forming a recess area insert having a proximal edge and a distal edge, the recess area insert proximal edge disposed to engage within the core member recess area; and
 forming a cap having a center hole configured to slidably engage around the shaft, the cap configured to engage the core.

19. The method for manufacturing a stripper roller for use in a subassembly of claim 18, wherein the step of forming the stripper roller further comprises extrusion.

20. The method for manufacturing a stripper roller for use in a subassembly of claim 18, wherein the step of forming the stripper roller further comprises molding from aluminum.

21. The method for manufacturing a stripper roller for use in a subassembly of claim 18, wherein the step of forming the stripper roller further comprises molding from thermoplastic.

22. The method for manufacturing a stripper roller for use in a subassembly of claim 18, wherein the step of forming the stripper roller further comprises molding from thermosetting resin.

23. A stripper roller for use in a subassembly, the stripper roller comprising:
 a shaft having an axially extending length and an axis of rotation;
 a core disposed around the shaft,
 a means for keying the core to the shaft such that the core is constrained to rotate around the shaft axis of rotation in rigid accompaniment with the shaft, the core comprising a first core member and a second core member, the first core member comprising
  a means to attach a first core member mating surface to a second core member mating surface,
  a means to slidably engage a brush member to the first core member, and
  a means to slidably engage a batt member to the first core member;
 a means to engage the core so that the first core member mating surface is held adjacent to the second core member mating surface, further means to contain the brush member and the batt member within the first core member; and
 a means to prevent the core from sliding along the shaft.

24. A stripper roller for use in a subassembly, the stripper roller comprising:
 a shaft having an axially extending length and an axis of rotation;
 a core disposed around the shaft,
 a means for keying the core to the shaft such that the core is constrained to rotate around the shaft axis of rotation in rigid accompaniment with the shaft, the core comprising a first core member and a second core member, the first core member comprising
  a means to attach a first core member mating surface to a second core member mating surface,
  a means to fixedly attach a brush member to the first core member, and
  a means to fixedly attach a batt member to the first core member;
 a means to engage the core so that the first core member mating surface is held adjacent to the second core member mating surface; and
 a means to prevent the core from sliding axially along the shaft.

25. A stripper roller for use in a subassembly, the stripper roller comprising:
 a keyed shaft having an axially extending length and an axis of rotation;
 a core disposed around the shaft comprising a core central recess configured to receive the shaft such that the core is constrained to rotate around the shaft axis of rotation in rigid accompaniment with the shaft, the core comprising a first core member with a first mating surface, and a second core member with a second mating surface configured to abut the first mating surface,
  a brush dovetail recess configured to slidably engage a brush member to the core, and
  a batt dovetail recess to slidably engage a batt member to the core;
 a locking ring configured to engage the core so that the first mating surface is held adjacent to the second mating surface, and to contain the brush member within the brush dovetail recess and the batt member within the batt dovetail recess; and an end cap configured to prevent the core from sliding axially along the shaft.

26. A stripper roller for use in a subassembly, the stripper roller comprising:

a shaft having an axially extending length and an axis of rotation;

a core disposed around the shaft, comprising a T-slot recess key keying the core to the shaft such that the core is constrained to rotate around the shaft axis of rotation in rigid accompaniment with the shaft, the core comprising a first core member and a second core member, the first core member comprising a T-slot recess mating surface a second core member mating surface, and a locking ring configured to attach a brush member and/or a batt member to the first core member;

a locking ring engage configured to engage the core so that the first core member mating surface is held adjacent to the second core member mating surface; and an end cap configured to prevent the core from sliding axially along the shaft.

* * * * *